United States Patent [19]
Gentric et al.

[11] Patent Number: 5,802,507
[45] Date of Patent: Sep. 1, 1998

[54] METHOD FOR CONSTRUCTING A NEURAL DEVICE FOR CLASSIFICATION OF OBJECTS

[75] Inventors: Philippe Gentric, Issy les Moulineaux; Jöel Minot, Charenton, both of France

[73] Assignee: U.S. Philips Corporation, New York, N.Y.

[21] Appl. No.: 888,414

[22] Filed: Jul. 7, 1997

Related U.S. Application Data

[63] Continuation of Ser. No. 449,465, May 24, 1995, abandoned, which is a continuation of Ser. No. 165,282, Dec. 10, 1993, abandoned.

[30] Foreign Application Priority Data

Dec. 16, 1992 [FR] France .................. 92 15190

[51] Int. Cl.$^6$ ...................................... G06F 15/18
[52] U.S. Cl. ............................. 706/25; 706/20
[58] Field of Search ..................... 395/22, 23, 24

[56] References Cited

U.S. PATENT DOCUMENTS

| | | | |
|---|---|---|---|
| 4,933,872 | 6/1990 | Vandenberg et al. | 395/22 |
| 4,941,122 | 7/1990 | Wideman | 395/24 |
| 4,975,961 | 12/1990 | Sakoe | 395/22 |
| 5,033,006 | 7/1991 | Ishizuki | 395/24 |
| 5,052,043 | 9/1991 | Gaborski | 395/23 |
| 5,060,278 | 10/1991 | Fukumizu | 395/22 |
| 5,067,095 | 11/1991 | Peterson et al. | 395/24 |
| 5,067,164 | 11/1991 | Denker | 395/22 |
| 5,129,039 | 7/1992 | Hiraiwa | 395/24 |
| 5,134,396 | 7/1992 | Sirat et al. | 395/22 |
| 5,146,541 | 9/1992 | Speidel | 395/24 |
| 5,155,801 | 10/1992 | Lincoln | 395/21 |
| 5,175,796 | 12/1992 | Refregier et al. | 395/22 |
| 5,182,794 | 1/1993 | Gasperi et al. | 395/23 |
| 5,228,113 | 7/1993 | Shelton | 395/23 |
| 5,239,594 | 8/1993 | Yoda | 395/23 |

(List continued on next page.)

OTHER PUBLICATIONS

Reilly et al., "A Neural Model For Category Learning", Biological Cybernetics, vol. 45, pp. 35–41, (1982).

Stokbro et al., "Exploiting Neurons with Localized Receptive Fields to Learn Chaos", Complext Systems, No. 4, (1990), 603–622.

Platt, "Learning by Combining Memorization and Gradient Descent", pp. 714–720. from *Advances, a Neural Information Processing*, 1991, vol. 1, Morgan Kaufman Ed. (Palo Alto).

Omohundro, "Bumptree for Efficient Function, Constraint, and Classification Learning", pp. 693–699, from *Advances in Neural Information Processing*, 1991, vol. 3, Mrogan Kaufman Ed. (Palo Alto).

"The Piecewise Linear Neural Network: Training and Recognition", by Y.H. Kong et al, IJCNN International Joint Conference On Neural Networks, Jun. 17–21, 1990, pp. III–245 to III–250.

"Unsupervised Learning for Neural Trees", by L. Fang et al, 1991 IEEE International Joint Conference On Neural Networks, Nov. 18–21, 1991, pp. 2709–2715.

*Primary Examiner*—Allen R. MacDonald
*Assistant Examiner*—Jeffrey S. Smith

[57] ABSTRACT

On the basis of a device without hidden neurons, arbitrary samples are taken from a set of learning samples so as to be presented as objects to be classified. Each time if the response is not correct, a hidden neuron ($H_i$) is introduced with a connection to the output neuron ($O_j$) of the class of the sample, whereas if the response is correct, no neuron whatsoever is added. During this introduction phase for hidden neurons, the neurons are subdivided into groups by searching for each of the introduced neurons whether it falls within an existing group, in which case it is incorporated therein; otherwise a new group is created around this neuron. The association with a group is defined as a function of the distance from the "creator" neuron. Application: character recognition systems.

5 Claims, 2 Drawing Sheets

U.S. PATENT DOCUMENTS

| | | | |
|---|---|---|---|
| 5,239,619 | 8/1993 | Takatori | 395/23 |
| 5,245,697 | 9/1993 | Suzuoka | 395/23 |
| 5,257,342 | 10/1993 | Takatori | 395/23 |
| 5,259,039 | 11/1993 | Akamatsu | 395/22 |
| 5,259,065 | 11/1993 | Takatori | 395/24 |
| 5,276,771 | 1/1994 | Manukian et al. | 395/24 |
| 5,280,564 | 1/1994 | Shiomi et al. | 395/24 |
| 5,317,675 | 5/1994 | Ikehara | 395/24 |
| 5,355,437 | 10/1994 | Takatori | 395/24 |
| 5,361,328 | 11/1994 | Takatori | 395/21 |
| 5,371,809 | 12/1994 | Desieno | 395/23 |
| 5,371,834 | 12/1994 | Tawel | 395/23 |
| 5,438,629 | 8/1995 | Moed | 395/21 |
| 5,479,575 | 12/1995 | Yoda | 395/24 |

METHOD FOR CONSTRUCTING A NEURAL DEVICE FOR CLASSIFICATION OF OBJECTS

This is a continuation of application Ser. No. 08/449,465, filed May 24, 1995, which is a continuation of U.S. Ser. No. 08/165,282, filed Dec. 10, 1993, both of which are now abandoned.

The invention relates to a method of constructing a neural device for the classification of objects by means of a set of learning samples or examples which form objects whose class is known. Each object to be classified is defined by an input vector which is represented by a point in a hyperspace. The device including a layer of input neurons, each of which corresponds to one of the dimensions of the hyperspace, a layer of hidden neurons whose inputs are connected exclusively to the input neurons and whose activation is based on the coordinates of a reference point of the hyperspace which is associated with the relevant hidden neuron, and a layer of output neurons, each of which corresponds to one of the classes. The method including in taking, starting from a device without hidden neuron, an arbitrary sample from said set of learning samples. In subsequently a first hidden neuron is placed in the device while defining the reference point associated with this neuron as being the point representing the sample taken in the hyperspace. An excitatory connection of positive weight is established between this hidden neuron and the output neuron corresponding to the class of the sample. Afterwards a new sample is taken from the set so as to be applied to the device as the object to be classified, if the response is not correct, a new hidden neuron corresponding to the new sample is introduced into the device by defining the reference point associated with this neuron as being the point representing the new sample, and by establishing a connection of positive weight between the hidden neuron and the output neuron corresponding to the class of the new sample. If the response is correct, no supplementary hidden neuron corresponding to the new sample is added. All remaining samples are treated in the same way until there are no samples left in the set.

The invention also relates to a neural device for classifying objects into J distinct classes. The objects to be classified are defined by input vectors with K coordinates which are represented by points in a hyperspace of K dimensions, which device comprises a layer of input neurons, comprising K neurons each of which corresponds to one of said dimensions, a layer of output neurons, comprising J neurons, each of which corresponds to one of said classes, and a layer of hidden neurons whose activation is calculated as a function of the coordinates in the hyperspace of a reference point associated with each hidden neuron.

A device thus constructed is used notably for the classification of objects, that is to say for the recognition of objects: it concerns, for example the recognition of shapes and notably the recognition of characters.

Such a method of construction is known from the document "A neural model for categories learning" by Douglas L. Reilly et al., published in "Biological Cybernetics", No. 45, 35–41 (1982). The network is constructed by incremental learning and the decision to determine the class is taken on the basis of a variable-threshold function which defines a domination volume around the samples in a hyperspace.

The more or less random introduction of the samples can nevertheless have the effect that, in order to achieve sufficient reliability, the number of hidden neurons reaches a value which is higher than that which would be obtained for optimum definition of these neurons, resulting in a longer calculation time during use of the network. The invention has for its object to provide a network which, constructed by means of this method, is very fast during use.

To this end, in accordance with the invention, groups of neurons with a neuron which is representative of each group are defined according to the introduction of hidden neurons while searching, for each of the neurons introduced, whether it forms part of a previously defined group, in which case it is incorporated therein, whereas if it does not form part of any previously defined group, a new group is formed for which it constitutes the representative neuron, the first neuron introduced thus having been defined as being representative of a first group.

According to this method, a neuron is preferably considered to form part of a given group if the distance between the reference point associated with this neuron and the reference point associated with the neuron which is representative of the relevant group is smaller than a given distance.

In a further embodiment, the groups in question being considered to be of a first level, at least one second given distance is defined which is greater than the first distance and on the basis of which at least second groups of a second level are defined in the course of the same process as the groups of the first level.

When two hidden neurons corresponding to two learning samples have representative points whose coordinates neighbour one another, without said samples belonging to the same class, an inhibitory connection of negative weight is advantageously inserted between the hidden neuron corresponding to one of the samples and the output neuron corresponding to the class of the other sample.

The reliability of the classification results is thus improved.

When the activation of the hidden neurons is a predetermined, non-adjustable function of the distance between the reference points, it may occur that the sensitivity of the device to differences between given samples is too low for correctly distinguishing the samples.

In order to solve this problem, a supplementary hidden neuron which corresponds to a learning sample is preferably inserted with a connection to the corresponding output neuron if for this sample, presented as an object to be classified, an output neuron is effectively activated for the desired class, but the difference between the activity of the output neuron which has the highest activation level, the output neuron which has the highest activation level but one is below a given threshold.

For a given organization of the network, the choice of the activation values for the hidden neurons and the selection rule determining the class as a function of the activation of the output neurons has an important impact on the performance. In the document cited above, the use of an activation function for the hidden neurons which is zero below the threshold does not allow for a progressive integration of the effect of "remote" learning samples, and the use of "binary" (all or nothing) neurons in the output layer does not allow for motivated decisions to be taken. Moreover, it is not possible to manage a situation in which two output neurons are simultaneously active.

Therefore, the method is more advantageously applied in a device in which the activation of a hidden neuron is a decreasing, e.g., an inverse, function of the geometrical distance in the hyperspace between the reference point associated with the hidden neuron and the point representing the input vector, in which activation of an output neuron is a function of an input threshold, and for which the class indicated as a result is that which corresponds to the most activated output neuron, subject to the condition that the difference between the activity of the latter and that of the output neuron whose activation is strongest after that of the most activated output neuron exceeds a given value.

This has *inter alia* the advantage that not only a winner can be proposed, but also a list of winners in decreasing order of probability, this is an important advantage for character recognition where said list can subsequently be used to correct errors on the basis of a dictionary.

A device of this kind in which the hidden neurons and their associated reference points have been determined and the hidden neurons have been subdivided into groups, each group comprising a neuron which is representative of the group, in conformity with the method in accordance with the invention, preferably comprises means for operating, upon presentation of a sample to be classified, only the representative hidden neurons during a first period, that is to say for all groups, and to determine which neuron provides the highest activation level, followed by operating, during a second period, all hidden neurons of the group or a few groups whose representative neuron (neurons) has (have) provided the highest activation level during the first period.

When several group levels have been defined, the device preferably comprises means for operating, upon presentation of a sample to be classified, only the hidden neurons representative of the groups of an $n^{th}$ level during a first period, and for determining which neuron provides the highest activation level, means for operating, during a second period, only the hidden neurons representative of the groups of the $(n-1)^{th}$ level contained in the group of the $n^{th}$ level whose representative neuron provided the highest activation level during the first period, and for determining which neuron provides the highest activation level, and so on until the first level is reached.

This device is also characterized in that, for each of the hidden neurons, the activation is calculated on the basis of the distance in the hyperspace between a reference point associated with this hidden neuron and the point representing the input vector, and to this end it comprises means for determining the activation of a hidden neuron having the index "i" e.g. by way of the formula $$\text{activation} = f\left( \sqrt[n^{th}]{\sum_{K=1}^{K=0} ((X_k - W_{ki})^n)} \, \sigma^i \right),$$

in which $W_{ki}$ represents the K coordinates of the sample having triggered the formation of the neuron "i", $\sigma_i$ is an adjustable coefficient associated with the neuron "i", $X_k$ represents the K coordinates of an input vector to be classified, n is an integer, for example equal to two, and the function "f" is a function which increases as its argument tends towards zero, an output neuron being such that it is activated only beyond a given activation threshold of a hidden neuron, there being provided means for indicating as a result the class which corresponds to the neuron of the output layer providing the highest activation level, subject to the condition that the difference between the activity of the latter and that of the output neuron whose activation level is highest but one exceeds a given value.

Preferably, this device comprises an inhibitory connection of negative weight between a hidden neuron corresponding to a sample and an output neuron corresponding to the class of another sample in the case where two hidden neurons corresponding to two learning samples have representative points whose coordinates neighbour one another, without said samples belonging to the same class.

These aspects of the invention as well as more detailed other aspects will be illustrated on the basis of the following description of a non-limitative embodiment of the invention.

Figure 1:
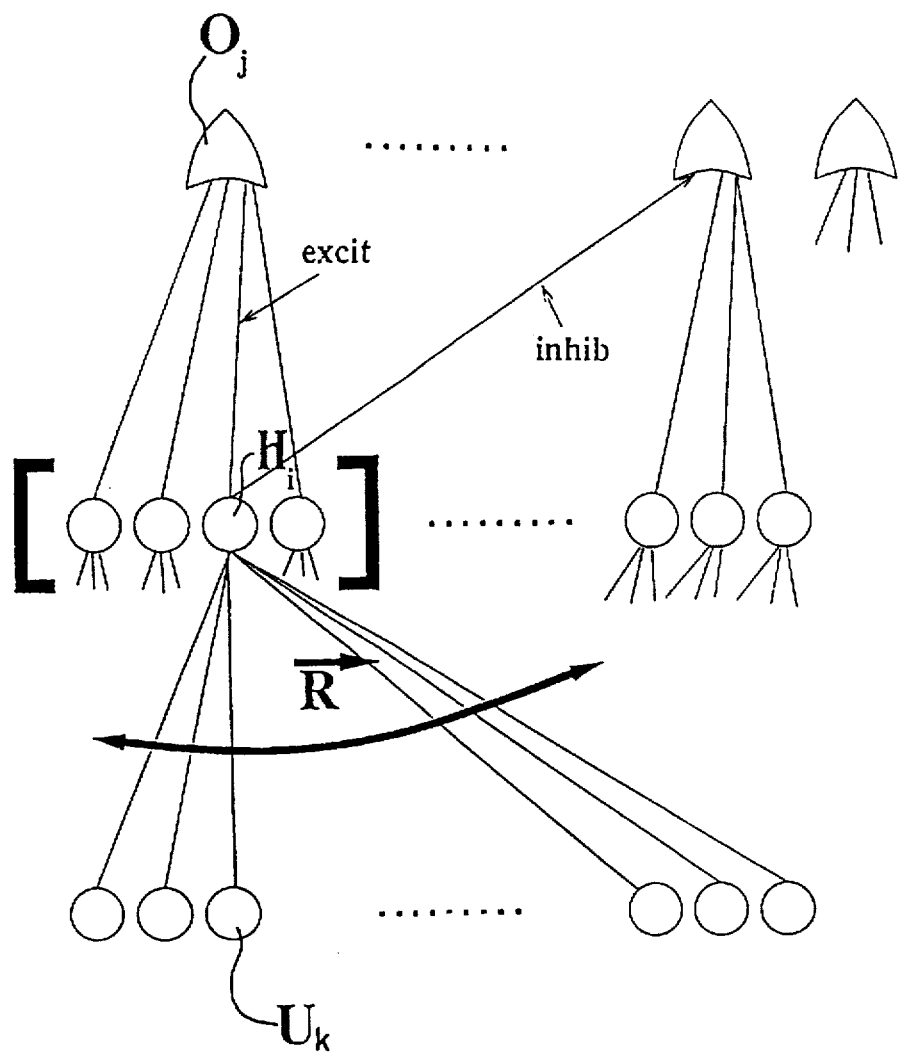
FIG. 1 shows diagrammatically a network of neurons which can be constructed in accordance with the invention.

The neural device whose diagram is shown in FIG. 1 is intended to perform classifications. This is to be understood to mean that when, in the presence of a population of objects which may be subdivided into distinct classes, the description of a sample of this population is presented to the device, the device determines the relevant class of the sample. For example, the objects may be letters of the alphabet presented in different shapes or appearances, and the classes are: "letter a", "letter b", etc.

An input datum, whether it concerns a learning sample whose class is known, or a sample whose class is to be determined by the device, is presented in the form of a vector with K coordinates or components in a hyperspace of K dimensions. In the case of letters, for example, a zone can be defined in which the letter is supposed to be present and this zone can be analysed in successive points, the brightness of each of these points providing one of the components of the input vector.

The device comprises a layer of input neurons $U_k$, the number of which equals the number K of coordinates of an input vector, with each input neuron there being associated an input value corresponding to one of the components of an input vector.

Each of the neurons $H_i$ of a layer of hidden neurons has an input connected to the output of one of the input neurons $U_k$. In order to not obscure the Figure, only the connections of the neurons U to one of the neurons H are shown, but in reality all neurons U are connected to all neurons H. However, none of the outputs of a hidden neuron is connected to an input of another hidden neuron.

The number $N_i$ of hidden neurons is a function of the difficulty of the classification problem to be solved, as will be described hereinafter.

Finally, the device comprises a layer of output neurons $O_j$, which layer comprises a number J of neurons, equal to the number of classes. Which ones of the hidden neurons are connected to which output neurons O will be described hereinafter.

The activation level of a hidden neuron $H_i$ is calculated on the basis of the distance, in the hyperspace, between the point representing the input vector applied to the neurons $U_k$ and a reference point which is associated with the neuron $H_i$.

Figure 2:
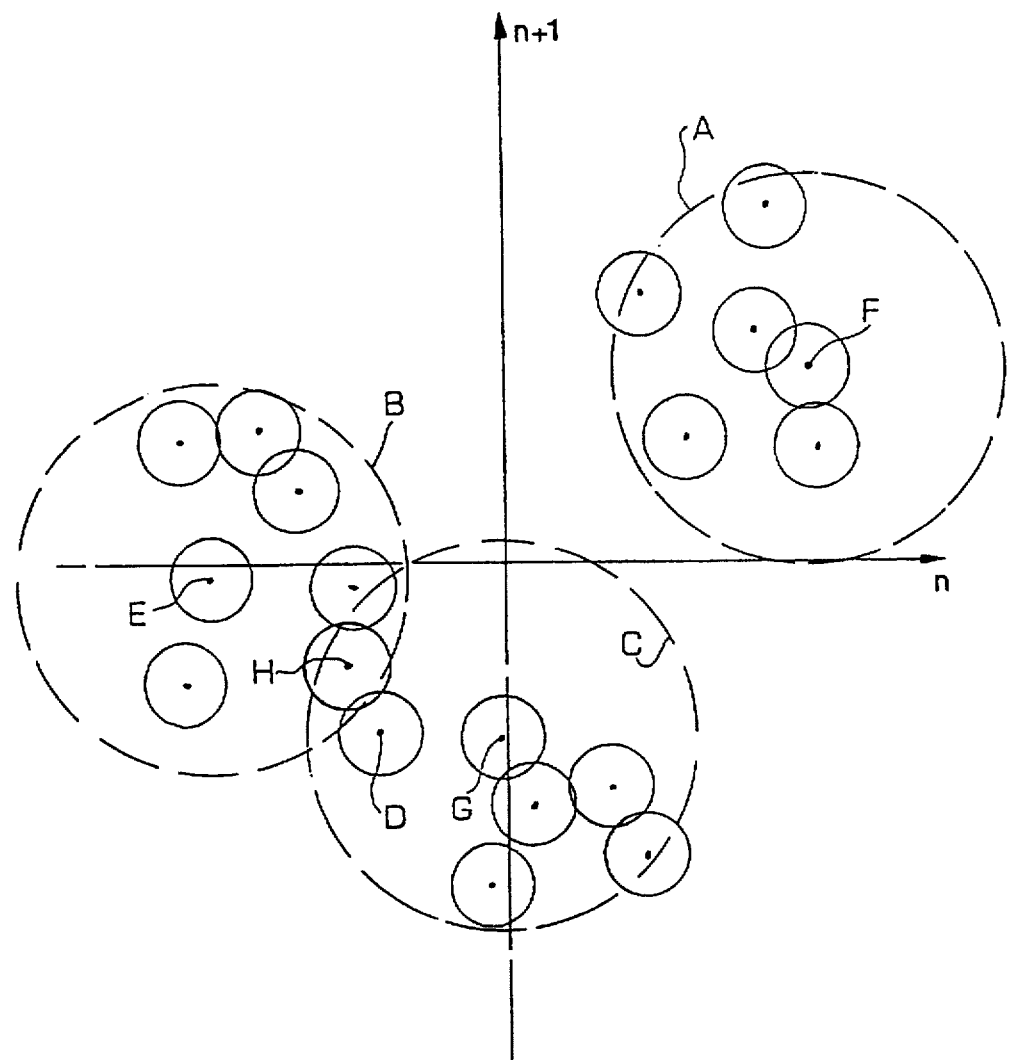
FIG. 2 shows representative points of samples in the hyperspace, two dimensions from among the K dimensions being represented.

Such points are shown in FIG. 2 as dots. It concerns a projection of the space on the plane of drawing. Each of the points represents a learning sample.

With each of these points there is associated a domain, represented by a small, solid circle, which encloses the point. This circle is the location of the points which are situated at a given distance from the sample. This distance is represented by the following formule:

$$\text{distance}(X, W) = n^{th} \text{ root of: } \left( \sum_{k=0}^{K-1} (|X_k - W_{ki}|)^n \right)$$

where $X_k$ represents the coordinates of a point in the space for which the distance is searched and $W_{ki}$ represents the K coordinates of the point corresponding to a neuron $H_i$, with respect to which the distance (X, W) is searched. The number n, in a Euclidean metric, equals 2 (in this case it is not useful to take the absolute value of the difference $X_k \times W_{ki}$). Any metric may be employed, provided that within this metric: distance (x,y)=distance (y,x) distance (x,z) ≦distance (x,y)+distance (y,z). The condition: distance (x,x) =0 is not necessary.

In order to construct such a device, it is known to cluster the samples and to position a single hidden neuron representing each cluster. The problem, however, consists in determining how to cluster the samples so as not to loose too much information and achieve the highest possible reliability for the classification results. Using the method in accordance with the invention, the elimination of those samples which need not be taken into account takes place automatically and no information whatsoever is lost.

The basis is formed by a network which does not comprise any hidden neuron. First of all an arbitrary sample is taken from the set of learning samples. This sample is thus withdrawn from the set: it will not be encountered again. A first hidden neuron corresponding to this sample is placed and the activation of this neuron is defined as a function of the position, in the hyperspace, of the point representing the sample in conformity with the formula:

$$\text{activation} = f\left( n^{th} \text{ root of} \left( \sum_{k=0}^{K-1} ((|X_k - W_{k1}|)^n) \sigma_1 \right) \right)$$

in which $X_k$ represents the coordinates of an input vector to be classified, the function f is a function which increases as its argument tends towards zero, for example a function of the type "exp(-x)" or a function of the type "1/(|x|+a)", $W_{k1}$ represents the coordinates of the point 1 representing the first sample, and $\sigma_1$ is an adjustable coefficient associated with the first neuron.

This hidden neuron $H_1$ is connected to the output neuron $O_j$ corresponding to the class of the sample.

Subsequently, a second sample is taken (for example, at random) from the set and is withdrawn from the set (so that it will not be encountered again). It is applied to the device as the object to be classified, and the device thus indicates a class to which the sample is assigned. Two cases are possible: either this class is effectively that of the second sample, or it is not. If the class is the correct one, an additional neuron is not installed and the process is continued by taking a third sample. When the class indicated is not correct, a second hidden neuron is placed in the device whose activation is defined by:

$$\text{activation} = f\left( n^{th} \text{ root of} \left( \sum_{k=0}^{K-1} ((|X_k - W_{k2}|)^n) \sigma_2 \right) \right)$$

where $W_{k2}$ represents the coordinates of the point representing the second sample giving rise to the formation of a neuron, and $\sigma_2$ is an adjustable coefficient associated with the second neuron, said second hidden neuron being connected to the output neuron corresponding to the class of the second sample.

This procedure continues by successively taking all remaining samples in an arbitrary sequence and presenting them to the device as objects to be classified, a new neuron being formed only if the indicated class is not correct, said neuron having the activation:

$$\text{activation} = f\left( n^{th} \text{ root of} \left( \sum_{k=0}^{K-1} ((|X_k - W_{ki}|)^n) \sigma^i \right) \right)$$

where $W_{ki}$ represents the coordinates of the sample having caused the formation of the neuron i, and $\sigma_i$ is an adjustable coefficient belonging to the neuron i.

This is continued until there are no samples left in the set. The device is thus constructed by itself by positioning the hidden neurons and their connections to the output neurons. If the class of the samples is more difficult to determine, i.e. if the problem is more difficult, here there will be more samples for which a correct response is not found (when the samples are applied to the device as objects to be classified), and the number of hidden neurons introduced will be greater.

In the case where the neural network is not real but simulated on a conventional computer, the calculations determining the class of a sample presented as an object to be classified are particularly fast at the start of the process, because there are very few neurons. The process subsequently slows down as new neurons are being introduced, but overall it remains very fast.

Let us consider the neighbouring points D and H of FIG. 2 and let us assume that they belong to different classes. It may occur that, during their examination as objects to be classified, the results obtained are the same for these two points, because of the fact that they are neighbours. It is to be understood that this case gives rise to a neuron, at least for the sample examined secondly, but it is also advantageous to complete the process by adding in this case, in addition to the normal synapse established between the hidden neuron thus created and the output neuron of the class found by error, an inhibitory synapse of negative weight. When this is done, the total number of output synapses at the most equals twice the number of hidden neurons.

Using the network described thus far, upon presentation of an object to be classified, all distances (in the hyperspace) between the point corresponding to the object presented and the points corresponding to all hidden neurons must be determined. In the case of simulation by means of a conventional computer, these operations are expensive. In order to reduce the calculation time, it is proposed to subdivide the samples into groups and to utilize only the hidden neurons which are representative of a group during a first period, after which in a second period adequate activation is searched, or better yet the highest activation, level from among the hidden neurons of the group whose representative neuron has provided the highest activation level during the first period. This two-period process will be described in detail hereinafter.

In the example of FIG. 2, the groups are bounded by hyperspheres A, B, C which are defined as the hidden neurons are being introduced. To this end, in the course of the process of introducing the hidden neurons, for each of the neurons introduced it is determined whether it forms part of a previously defined group in which case it is incorporated therein, whereas if it does not form part of any previously defined group, a new group is formed in which it constitutes the representative neuron. The first neuron introduced, therefore, is defined as being representative of the first group. A neuron is considered to form part of a given group if the distance between the reference point associated with this neuron and the reference point associated with the neuron representative of the group in question is smaller than the radius of a hypersphere of given radius which is centred around the point of reference corresponding to the neuron which is representative of the group; in other words, if it is situated within said hypersphere. The radius in question is a quantity of the same nature as the parameter $\sigma_i$ defined above. Thus, for example one can imagine that during the formation of the network the point F is encountered first, none of the other points of the hypersphere A having been found until then. A hypersphere A is then defined so as to be centred around the point F. When the point E is encountered, it does not form part of the hypersphere A (nor of any other sphere), so that a hypersphere B is created. When subsequently the point G is encountered, the hypersphere C is created because this point does not form part of preceding hyperspheres. The other points located inside the hyperspheres have been encountered after the point F has been established in as far as the points of the hypersphere A are concerned, after the point E has been established in as far as the points of the hypersphere B are concerned, and after the point G has been established in as far as the points of the hypersphere C are concerned. It is to be noted that if, for example, the point D had been encountered before the point G, a hypersphere would have been created with the point D as its centre. The point G would then be contained therein, and hence the hypersphere C would not have been created.

Thus, in the course of the process of introducing the hidden neurons, for each example not only the response (the classification) delivered by the device is considered, but also, in the case where said example leads to the introduction of a new neuron, if the corresponding point is already present within an existing hypersphere. The subdivision into groups is thus established already at the end of the main process, without a supplementary pass being necessary.

It appears that the method of defining the groups depends on the order in which the learning samples are encountered, so that chance has an effect on the process. Hyperspheres can thus be subject to have parts in common with each other. For example, the point H is defined indifferently as forming part of the group B or the group C, depending on whether the point E or the point G has been encountered first during the calculation of the distances between the point H and the centres of the hyperspheres. It has been found that this is not a drawback and that the performance of the ultimate device is not affected thereby, notably due to the mode of use of the latter.

A method of defining a given grouping level for hidden neurons has been described above. The term "grouping level" is to be understood to mean that a group comprises a more or less large number of neurons, i.e. the radius of the hypersphere defining the group is more or less large. Evidently, a second level or several other levels could be readily determined in the same manner. It would then suffice to define one or several other (increasingly larger) radii for hyperspheres centred around the reference point corresponding to the neuron which is representative of a group (the criterion of association with a group being that a point is situated within said hypersphere); on the basis thereof groups of several levels could be defined in the course of the same process.

During use of the device, the class of a sample is determined as follows:
—during a first period, exclusively the hidden neurons which are representative of a group are utilized, for example, all neurons corresponding to the points situated within the same hypersphere A are represented by the hidden neuron F, those situated within the same hypersphere B being represented by the hidden neuron E, and those situated within the same hypersphere C being represented by the hidden neuron G, and the neuron having the highest activation level is determined, —after which, during a second period, the activation of the other neurons of the group whose representative neuron has given the highest activation level in the first period is calculated and as soon as a neuron is found whose activation level exceeds a given threshold (in other words, when the point representative of the sample is situated within a hypersphere of a given radius centred around the point which is representative of the neuron), this neuron is considered to be the winner. Instead of stopping at that instant, the search can be extended by searching for the highest activation level from among all hidden neurons of the group whose representative neuron has given the highest activation level during the first period. If this was, for example, the group C, it may occur that during the second period the neuron corresponding to the point D has the highest activation level. It is to be noted that it is perfectly well possible for the point D not to belong to the same class as the point G. The input sample will then be classified in the class of the point D. This is notably why the random aspect of the determination of the groups ultimately is not a drawback.

It will be clear that the process can be readily applied to the case where there are more than two levels of grouping of the hidden neurons; this can be done by successively dealing with the levels in order of decreasing dimensions of the corresponding groups.

When, in addition to a normal synapse established between a hidden neuron and an output neuron, an inhibitory synapse of negative weight is added for learning samples having points which are neighbours without belonging to the same class, the rule for determining whether or not these points are neighbours can be, for example that the two examples of different classes form part of the same group.

It will be readily understood that the calculation time is reduced, because if there are, for example 900 hidden neurons divided into 30 groups of 30 neurons, only 30+30 activation levels have to be calculated instead of 900.

The search can also be extended by searching for the highest activation level not among the hidden neurons of a single group, but among those of a few groups whose representative neurons have given the highest activation levels during the first period. This prolongs the calculation slightly, but higher reliability is achieved. For example, a given number of groups can be chosen at random, all neurons of said groups being considered during the second period, or a minimum activation threshold can be established during the first period in order for a neuron to be "admitted" to the second period.

Another means of extending the search is to "impose" a radius which is larger than the radius chosen at the beginning for the hypersphere defining a group of a given level.

When a hidden neuron is connected to the appropriate output neuron, an excitatory synapse is created by arbitrarily assigning a positive weight, said weight thus being the same for all these connections. The weight in question, as well as the adjustable coefficients $\sigma_i$, can ultimately be calibrated when all hidden neurons have been installed, for example by means of a known error backpropagation method which does not require excessive execution time because an approximate solution is already available. Moreover, the sub-division into groups can be utilized to accelerate the error backpropagation process. During such a process a sample is presented to the input, the network (propagation) is evaluated, and the error is calculated, after which the error is "backpropagated" by gradually modifying the weights. Utilizing the sub-division into groups, evaluation time is gained because only a part of the network is evaluated; a gain is also made during the backpropagation because not all weights and all $\sigma_i$ of the network are modified, but only those which concern the outputs linking the hidden neurons of the useful group (groups) for which the list has been stored in the course of propagation.

In order to limit any drawbacks due to the fact that the hidden neurons have been created slightly at random, it is also possible to execute, once the device has been created a "pruning" process so as to remove superfluous neurons. This can be performed, for example by proposing again the learning examples as samples to be recognized, but desactivating each time the hidden neuron which has been positioned as this example. If the result is nevertheless correct, this neuron can therefore be dispensed with.

We claim:

1. A method of constructing a neural device for the classification of objects, where the neural device is trained using a set of learning samples of objects having known classes, each object to be classified being defined by an input vector which is represented by a point in hyperspace, the device comprising:

a layer of input neurons, each of which corresponds to one of the dimensions of the hyperspace;

a layer of hidden neurons whose inputs are connected exclusively to the input neurons, activation of each hidden neuron being based on coordinates of a respective reference point of the hyperspace; and a layer of output neurons, each of which corresponds to a respective class of the objects;

the method comprising:

a) applying an arbitrarily chosen sample from said set of learning samples to the neural device for classification;

b) subsequently placing a hidden neuron in the device, while defining the respective reference point associated with said hidden neuron as the point in hyperspace representing the sample;

c) establishing an excitatory connection of positive weight between said hidden neuron and the output neuron corresponding to a class of the sample;

d) choosing a new sample from said set of learning samples;

e) applying the new sample to the device for classification;

f) if, as a result of step e), a response of the device to the new sample does not give a correct classification, introducing into the device every time an incorrect classification occurs a new hidden neuron, corresponding to the new sample, by I) defining the respective reference point associated with the new hidden neuron as being the point representing the new sample and;

II) establishing an excitatory connection of positive weight between the new hidden neuron and the output neuron corresponding to the class of the new sample;

g) if the response does give the correct classification, skipping step f);

h) treating all remaining samples according to steps e), f) and g) until there are no samples left in said set of learning samples; and i) defining groups of neurons, with one neuron that is representative of each group and the group defined as all neurons located within a hypersphere of a predetermined radius centered in hyperspace upon the representative neuron, as the new hidden neurons are introduced, according to the following process:

I) determining, for each of the new hidden neurons, whether that new hidden neuron is located within the hypersphere of a previously defined group;

II) in response to a positive result from the determining step, incorporating that new hidden neuron into the group defined by the hypersphere in which that new hidden neuron is located; and III) in response to a negative result from the determining step, forming a new group defined as all neurons located within a hypersphere of a predetermined radius centered upon the new hidden neuron, the new hidden neuron thus being defined as representative of the new group.

2. A method as claimed in claim 1, characterized in that a neuron is considered to form part of a given group if the distance between the reference point associated with this neuron and the reference point associated with the neuron which is representative of the given group is smaller than a given distance and further including the step of starting sample application without a hidden neuron in the neural device.

3. A method as claimed in claim 2, wherein, the groups being considered to be of a first level, defining at least one second given distance which is greater than the first distance; and defining at least second groups of a second level based on the second given distance during the process.

4. A method as claimed in claim 1, characterized in that when two hidden neurons corresponding to two learning samples have representative points whose coordinates neighbour one another, without said samples belonging to the same class, an inhibitory synapse of negative weight is inserted between the hidden neuron corresponding to one of the samples and the output neuron corresponding to the class of the other sample.

5. A method as claimed in claim 1, characterized in that a supplementary hidden neuron which corresponds to a learning sample is inserted with a connection to the corresponding output neuron if for this sample, presented as an object to be classified, an output neuron is effectively activated for the desired class, but the difference between the activity of the output neuron with the highest activation level and that of the output neuron with the highest activation level but one is below a given threshold.

* * * * *